United States Patent
Weatherbee et al.

(10) Patent No.: US 10,401,803 B2
(45) Date of Patent: Sep. 3, 2019

(54) APPARATUS AND METHOD FOR COMPUTER CODE ADJUSTMENTS IN AN INDUSTRIAL MACHINE

(71) Applicant: General Electric Company, Schenectady, NY (US)

(72) Inventors: Paul Weatherbee, Edmonton (CA); Michael Behnke, San Ramon, CA (US); Nilesh Dixit, San Ramon, CA (US)

(73) Assignee: General Electric Company, Schenectady, NY (US)

( * ) Notice: Subject to any disclaimer, the term of this patent is extended or adjusted under 35 U.S.C. 154(b) by 215 days.

(21) Appl. No.: 15/276,497

(22) Filed: Sep. 26, 2016

(65) Prior Publication Data

US 2018/0088540 A1 Mar. 29, 2018

(51) Int. Cl.
| | |
|---|---|
| *G05B 13/02* | (2006.01) |
| *G06F 16/9032* | (2019.01) |
| *G05B 23/02* | (2006.01) |
| *G05B 19/408* | (2006.01) |

(52) U.S. Cl.
CPC ....... *G05B 13/021* (2013.01); *G05B 19/4083* (2013.01); *G05B 23/0286* (2013.01); *G06F 16/90324* (2019.01); *G05B 2219/25064* (2013.01); *G05B 2219/31449* (2013.01); *G05B 2219/36043* (2013.01); *G05B 2219/36046* (2013.01); *G05B 2219/36505* (2013.01)

(58) Field of Classification Search
CPC ........ G05B 13/021; G05B 2219/31449; G06F 17/3097

USPC ......................................................... 700/111
See application file for complete search history.

(56) References Cited

U.S. PATENT DOCUMENTS

| | | | |
|---|---|---|---|
| 5,288,209 A | 2/1994 | Therrien et al. | |
| 2007/0093925 A1 | 4/2007 | Moughler | |
| 2009/0132080 A1* | 5/2009 | Glasser | B23Q 15/22 700/105 |
| 2011/0088021 A1* | 4/2011 | Kruglick | G06F 8/443 717/149 |

(Continued)

FOREIGN PATENT DOCUMENTS

DE 10 2005 020 507 A1 11/2006

OTHER PUBLICATIONS

International Search Report and Written Opinion issued in connection with corresponding PCT Application No. PCT/US2017/052275 dated Dec. 4, 2017.

*Primary Examiner* — Robert E Fennema
*Assistant Examiner* — Jigneshkumar C Patel
(74) *Attorney, Agent, or Firm* — Fitch Even Tabin & Flannery LLP

(57) ABSTRACT

A manufacturing action is performed on a first part or first component involved in a manufacturing process. The manufacturing action is directed by computer software that is stored in a memory and executed by a processor. The first part or first component is examined to determine results of the manufacturing action. Based upon the results, a structure of the computer software is selectively changed to optimize the results. Subsequently the manufacturing action is performed on a second part or second component. The manufacturing action is directed by the computer software having the changed structure.

17 Claims, 5 Drawing Sheets

(56) References Cited

U.S. PATENT DOCUMENTS

| | | | |
|---|---|---|---|
| 2015/0234765 A1* | 8/2015 | Kline | G06F 13/4022 |
| | | | 710/316 |
| 2015/0261204 A1* | 9/2015 | Honda | G05B 19/404 |
| | | | 700/114 |
| 2016/0062336 A1 | 3/2016 | Hitomi et al. | |
| 2016/0070822 A1* | 3/2016 | Makinen | G06F 17/50 |
| | | | 700/98 |
| 2016/0274558 A1* | 9/2016 | Strohmenger | G05B 19/0428 |

* cited by examiner

APPARATUS AND METHOD FOR COMPUTER CODE ADJUSTMENTS IN AN INDUSTRIAL MACHINE

BACKGROUND OF THE INVENTION

Field of the Invention

The subject matter disclosed herein generally relates to industrial machines and adjusting the manufacturing processes employed by these machines.

Brief Description of the Related Art

Various types of industrial machines are used to perform various manufacturing operations and tasks. For instance, some machines are used to create and finish parts associated with wind turbines. Other machines are used to create mechanical parts or components utilized by vehicles. Still other machines are used to produce electrical parts (e.g., resistors, capacitors, and inductors to mention a few examples). Typically, industrial machines are controlled at least in part by computer code (or a computer program) that is executed by a processor that is located at the machine.

Sometimes the results of the manufacturing operation are not optimal. For example, the manufacturing operation may take too much time, or the resultant product may have dimensions that vary from a required specification. These problems affect the efficiency of the entire manufacturing facility and increase customer dissatisfaction with the product created by the process.

Previous attempts to address these problems have not been made, but unfortunately, have not been successful.

BRIEF DESCRIPTION OF THE INVENTION

The present invention is directed to improving manufacturing processes, including manufacturing processes of complex parts that may require significant time to manufacture, by receiving, analyzing, and adjusting computerized manufacturing process instructions during the course of manufacture. In some embodiments, the invention described herein may analyze the adjusted inputs and expected results of a manufacturing process in assessing the need for rework repair or subsequent manufacturing processes. The invention herein may optionally implemented using a computerized industrial internet of things analytics platform that may be deployed at the location of the manufacturing process, at the manufacturing facility premise or in the cloud.

In manufacturing processes (e.g., manufacturing a wind turbine ring), the computer program or code used in industrial machines (that executes the steps in a manufacturing process) is selectively changed. With various embodiments of the present invention, the results of performing manufacturing steps on a product are tracked. Then, adjustments are made to the code (e.g., new code may be injected into the original code) and the results of the adjustments may be further tracked. Mappings from expected manufacturing results to the code responsible (or code changes needed) for achieving these results may be utilized by these approaches. The results may be tracked over time in order to make future adjustments to the manufacturing code, avoid failures, improve efficiency, and to improve estimation.

In many of these embodiments a manufacturing action is performed on a first part or first component involved in a manufacturing process. The manufacturing action is directed by computer software that is stored in a memory and executed by a processor. The first part or first component is examined to determine results of the manufacturing action. Based upon the results, the structure of the computer software is selectively changed to optimize the results. Subsequently the manufacturing action is performed on a second part or second component. The manufacturing action is directed by the computer software having the changed structure.

In some aspects and when the results are acceptable, the structure of the software is re-set to its original structure. In some examples, changing of the structure is accomplished by changing a computer variable in the computer software. In other examples, changing the structure is accomplished by adding computer code to the existing computer software. In yet other examples, changing the structure is accomplished by deleting computer code from the existing computer software.

The manufacturing action may be a wide variety of actions. For example, the action may be grinding, milling, measuring, and cutting. Other examples are possible.

In other aspects, recommendations for adjustments to the computer software are determined and the recommendations are displayed to a user. In other examples, user input as to whether to accept the recommendation is accepted at a user interface. In still other examples, the results are recorded for future usage.

In other embodiments, a system includes an industrial machine and an analyzer circuit. The industrial machine is configured to perform a manufacturing action on a first part or a first component. The machine includes a controller executing computer software that directs the manufacturing action.

The analyzer circuit is configured to examine the first part or first component to determine results of the manufacturing action. The analyzer circuit is further configured to, based upon the results, selectively change a structure of the computer software. The machine is configured to subsequently perform the manufacturing action on a second part or second component. The manufacturing action is directed by the computer software that has the changed structure.

In some aspects, the machine is configured to, when the results are acceptable, re-set the structure of the software to its original structure. In some examples, the structure is changed by making a modification to a computer variable in the computer software. In other examples, the structure is changed by adding computer code to the computer software. In still other aspects the structure is changed by deleting computer code from the computer software.

In other examples, the machine determines potential adjustment recommendations to the computer software and displays the recommendations to a user. In other examples, a user interface is coupled to the machine, and the user interface is configured to accept user input as to whether to accept the recommendation. In aspects, the analyzer circuit is configured to record the results for future usage.

BRIEF DESCRIPTION OF THE DRAWINGS

For a more complete understanding of the disclosure, reference should be made to the following detailed description and accompanying drawings wherein.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE INVENTION

The present approaches advantageously improve the results of manufacturing processes by selectively changing the computer code that controls these processes. In other words, the present approaches achieve a physical transformation of the computer code from a first structure, to a second structure. In some examples, the second structure is changed back to the first structure.

As used herein, "computer code" or "software" means the physical representation of a computer program on physical media (e.g., different bit patterns stored at a storage media such as a disc drive or electronic memory). The computer code may be (or represent) various computer instructions, data structures, variables, or any other software construct used in any type of computer program.

Figure 1:
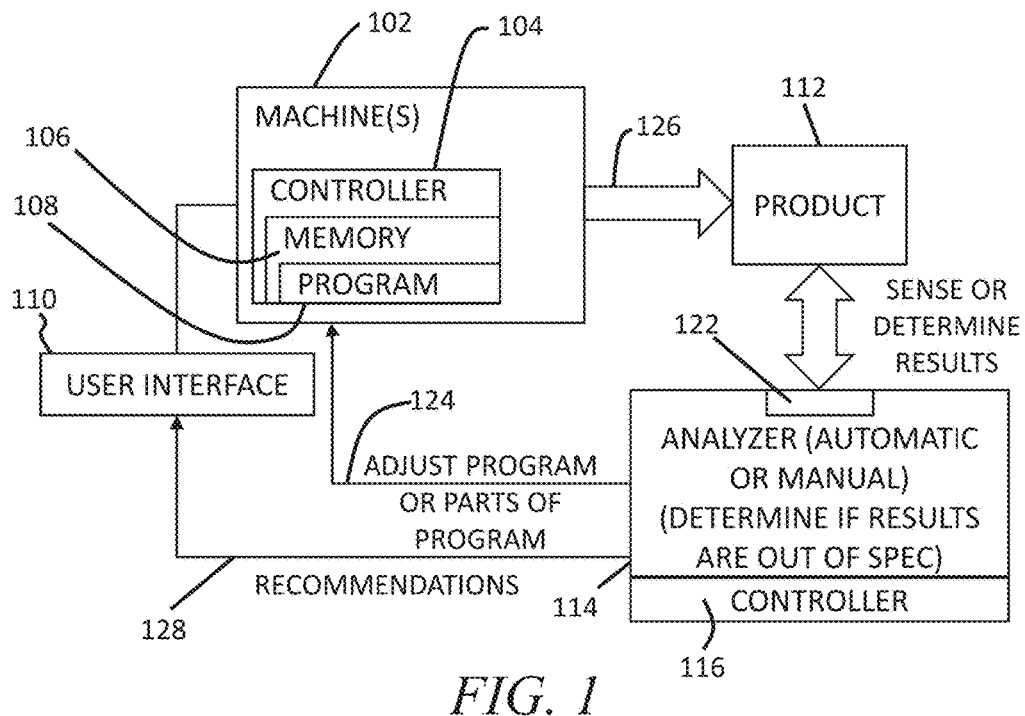
FIG. 1 comprises a block diagram of a system that adjusts the software structure of an industrial machine according to various embodiments of the present invention.

Referring now to FIG. 1, one example of a system that changes or transforms the structure of computer code used in a manufacturing process is described. The system includes a machine 102 (including a controller 104 with a memory 106 that stores computer program or software 108), a user interface 110, a product 112, and analyzer circuit 114 (including a second controller 116).

The machine 102 is any type of industrial machine that performs one or more operations on the product 112. For example, the industrial machine may be a lathe, a grinding machine, or a saw to mention a few examples. Other examples are possible.

The controller 104 may be any type of processing device such as a microprocessor or the like. The memory 106 may be any type of memory (such as a programmable read only memory, or a random access memory, to mention two examples). The memory 106 is shown as being incorporated with the controller 104, but in other examples may be a separate device.

The computer program or software 108 is any combination of software elements that are used to direct the operation of the machine 102. In aspects, the software 108 may include subroutines, procedures, or other software constructs that control the operation of the machine 102. The software 108 directs the machine 102 to execute manufacturing operations on the product 112. The product 112 may be any type of product that is produced, created, altered, adjusted, or influenced by the machine 102. For example, the product 112 may be a metallic ring (e.g., used on a wind turbine), an electronic component, a circuit, or any type of product produced in a manufacturing process.

The user interface 110 may be any type of user interface device (and include a graphical user interface) that accepts user input that in some way controls the machine 102. The user interface 110 may include a display that renders information to a user. It will be appreciated that in some examples the user interface 110 need not be used. In other words, the analyzer circuit 114 may make software adjustments without any manual intervention or input from a user. The user interface 110 may, in one example, display recommendations from the analyzer circuit 108 on a screen and receive input from a user that indicates whether the user wishes to accept the recommendations. The user input may be received at the interface 110 (e.g., from a touchscreen or keyboard to mention two examples of input devices).

The analyzer circuit 114 is any combination of hardware or software, which analyzes results of the manufacturing process on the product 112. The analyzer circuit may include one or more sensors 122 that sense aspects associated with the product 112 that has completed the manufacturing process. The sensors 122 may be a device that senses dimensions, strengths, or other characteristics of a product 112 that has finished the manufacturing process. In different examples, a human may manually examine the product 112 and determine whether the product meets predetermined criteria. The results of this analysis may be entered into the analyzer circuit 114.

The second controller 116 controls processing operations at the analyzer circuit 114. The controller 116 may analyze the inputs and determine an adjustment to the computer software 108 that brings aspects or characteristics of the product 112 to be within predetermined criteria.

In one example, the analyzer circuit 114 has sensors 122 that measure the time to complete a product. When the measured time is too slow, the controller 116 determines that the speed of the machine 102 must be increased. The controller 116 determines that speed is controlled by a variable within the software 108 and this variable is changed by sending control signal 124 to the machine 102. Control signal 124 may include the identification information (e.g., the variable name) and a value (e.g., the new value of the variable).

The machine 102 receives the control signal 124 and the controller 104 accesses the software 108 stored in the memory 106. The controller 104 physically changes the value of the variable within the software 108. The software 108 is then executed on a second product and the process is repeated until the product is produced within the required time frame. In other aspects, the software 108 may be modified to return to its original state (e.g., the variable may be re-written to have its original value) after the product 112 is produced within the pre-selected criteria.

It will be appreciated that the physical structure of the software 108 is changed, modified, and/or transformed using the approaches described herein. That is, the actual physical structure of the code 108 as stored in the memory 106 is changed. To take one example, the underlying bit pattern of the digital bits that represent the code 108 as stored in the memory 106 is changed or transformed.

It will be appreciated that there are various changes that can be made to the software 108. In one sample, a variable value is changed. In another example, the value of a constant is changed. In still another example, a second section or segment of computer code (e.g., a subroutine) is added to (injected in) the software 108. In yet other examples, a section of code is deleted (e.g., a subroutine and calls to that subroutine are removed) from the software 108.

In another example of the operation of the system of FIG. 1, a manufacturing action 126 is performed on a first part or first component 112 that is involved in a manufacturing process. The manufacturing action 126 is directed by the computer software 108 that is stored in the memory 106 and executed by a processor or controller 104. The analyzer circuit 114 examines the first part or first component 112 to determine results of the manufacturing action 126. Based upon the results, the structure of the computer software 108 is physically changed to optimize the results. Subsequently, the manufacturing action 126 is performed on a second part or second component, and the manufacturing action 126 is then being directed by the computer software 108 having the changed structure.

In other aspects, when the results are acceptable, the structure of the software 108 is physically re-set and changed to its original structure.

The manufacturing action 126 may be a variety of actions such as grinding, milling, measuring, and cutting. Other examples are possible.

In other aspects, the analyzer circuit 114 may determine recommendations for adjustments to the computer software and send a signal 128 to the user interface 110 that displays the recommendations to a user. The user interface 110 may accept user input as to whether to accept the recommendation in the signal 128. For example, the recommendation may be for an adjustment of the speed of the machine 108 and the user interface 110 may show the recommendation (e.g., "increase the speed") and accept input from a user that controls whether the speed is actually adjusted. In this example, the user ultimately controls whether the software 108 is changed (while in other examples the software 108 may be automatically (always) changed without any user input or permission).

Figure 2:
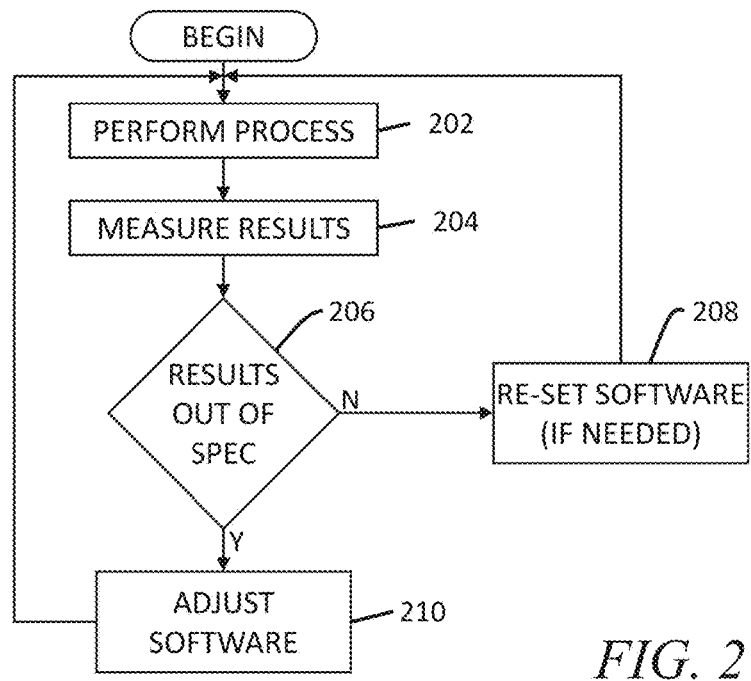
FIG. 2 comprises a flowchart of an approach that adjusts the software structure of an industrial machine according to various embodiments of the present invention.

Referring now to FIG. 2, one example of an approach for changing software at an industrial machine is described. At step 202, a manufacturing process is performed on a product. At step 204, the results of the manufacturing process are measured by analyzing parameters or aspects of the product that has completed the process. For example, selected dimensions of the product may be measured. In other examples, the time needed to complete the process is measured. In other examples, multiple parameters or aspects are measured.

At step 206, it is determined whether the measured parameters are outside acceptable values. In one example, if there is a product specification a determination is made as to whether these values are outside this specification. For example, an acceptable time value to complete the process may be one minute and it may be determined whether the actual time required to complete the process exceeded one minute.

If the answer at step 206 is negative, at step 208 the software is re-set (changed) to its original structure (if the software has in fact been changed) and execution continues with step 202 as has been described above. If the answer at step 206 is affirmative, at step 210 an appropriate adjustment to the software is made. For example, a variable or constant value may be changed, or subroutines or other sections of code may be added or deleted from the software. Execution continues at step 202.

Figure 3:
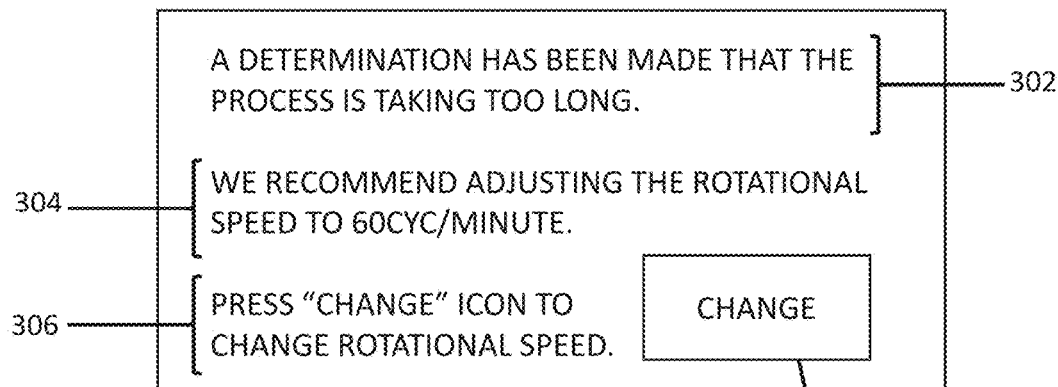
FIG. 3 comprises a diagram of one example of a user screen rendered at a user interface according to various embodiments of the present invention.

Referring now to FIG. 3, one example of a display at a screen 300 on a user interface is described. The user interface 300 has a first field 302 identifying a problem ("A determination has been made that the process is taking too long."). A second field 304 indicates a recommendation ("We recommend adjusting the speed to 60 cycles/minute.") A third field 306 guides the user ("Press 'change' icon to change the rotational speed.") In aspects, the scene is created by an analyzer circuit (analyzer circuit 114 of FIG. 1). When the user presses icon 308, the software (e.g., software 108 of FIG. 1) is changed.

Figure 4:
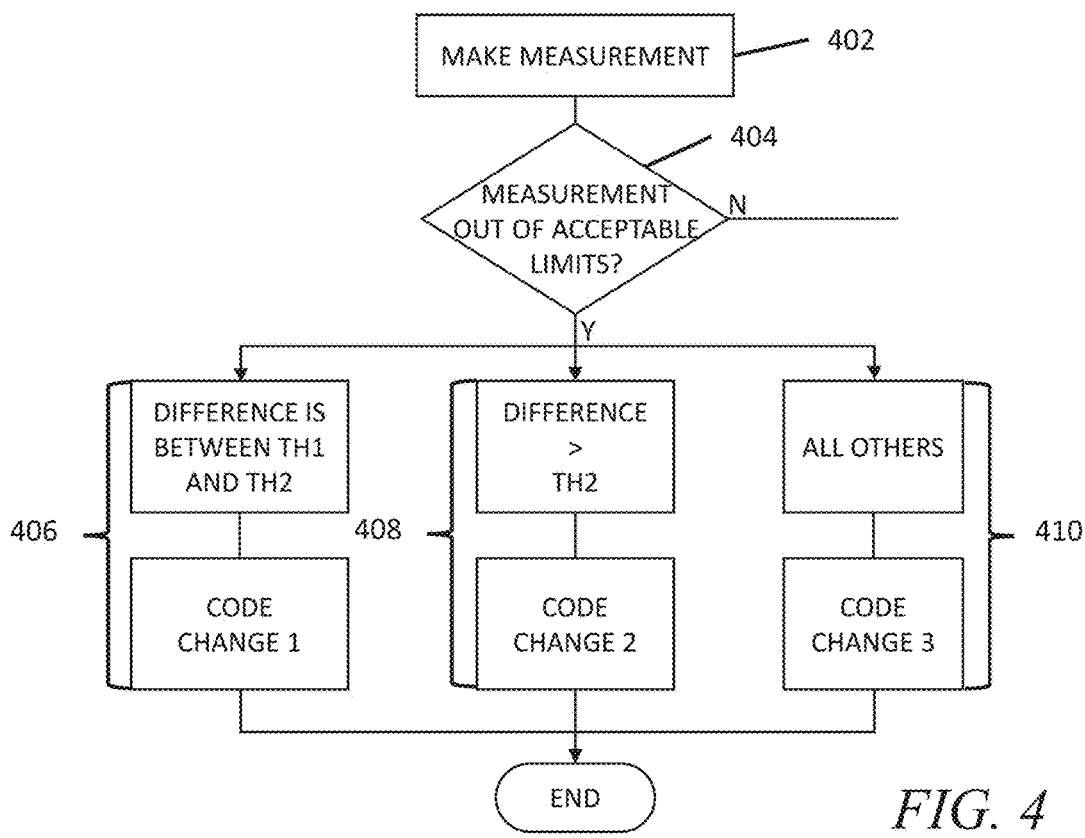
FIG. 4 comprises a flowchart of one approach for determining a change to computer software of an industrial machine according to various embodiments of the present invention.

Referring now to FIG. 4, one example of an approach for determining adjustments to industrial machine software is described. At step 402, a measurement or observation is made. The measurement may be made by a sensor, e.g., a speed sensor, a physical dimension measurement device, or a scale to mention a few examples. In some examples, the measurement or observation may be made by a human.

At step 404, it is determined whether the measurement or observation is within an acceptable range or value. For example, the measurement may be compared to a predetermined threshold. If the answer is affirmative, then execution ends.

If the answer at step 404 is negative, then determinations are made as to the adjustment to the computer code. In this example, a mapping is created between the amount of variance in the measurement value to an acceptable value, and the change to the code. In this example at step 406, if the measured value differs from the acceptable value between a first threshold and a second threshold, then a first software adjustment is made. At step 408, and if the measured value differs is above the second value, then a second adjustment is made. For all other differences, a third adjustment is made at step 410. The first adjustment may involve setting a variable to a first value, while the second adjustment involves setting the variable a second value, and the third adjustment involves setting the variable to a third value.

Figure 5:
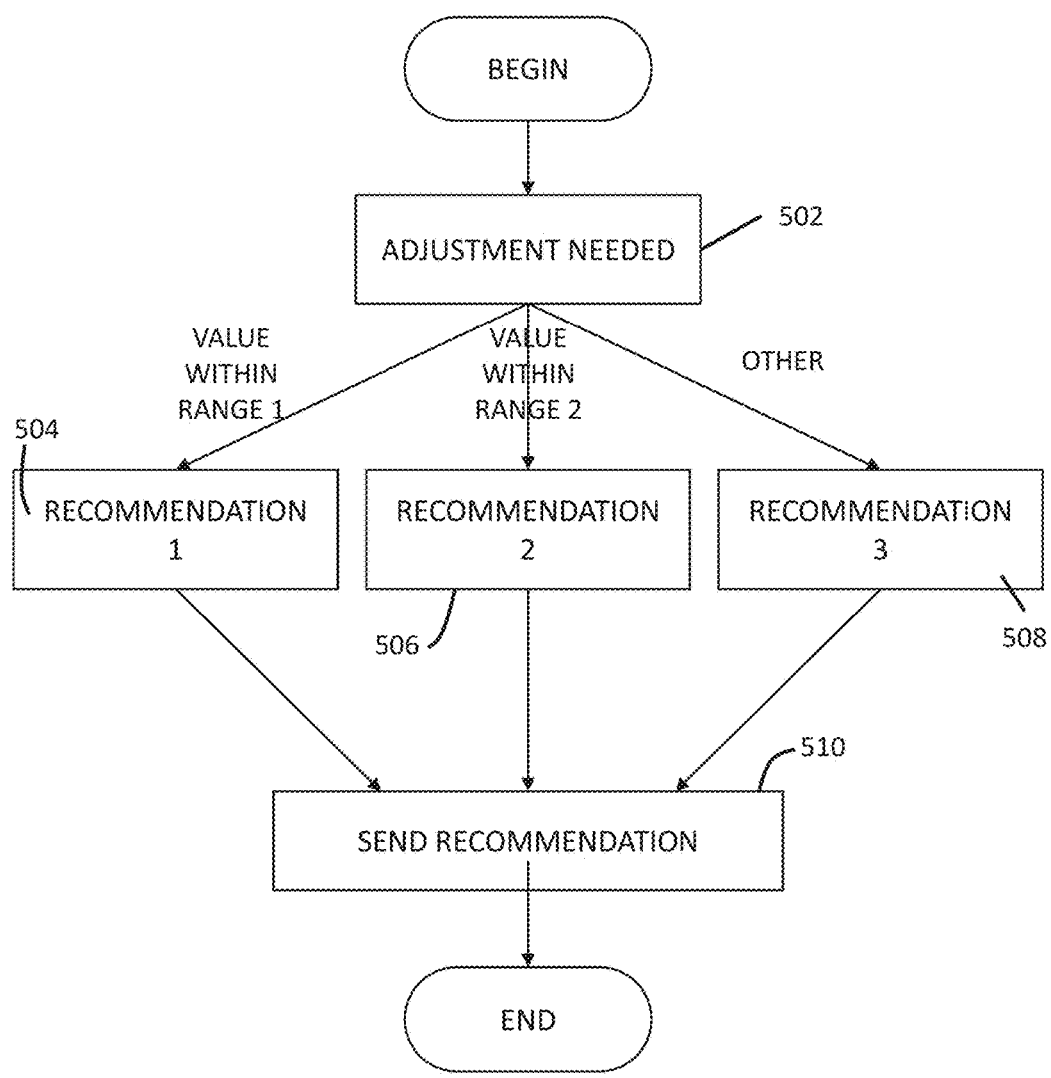
FIG. 5 comprises a flowchart of one approach for determining a recommendation to a user for a potential software change according to various embodiments of the present invention.

Referring now to FIG. 5, one example of an approach for determining recommendations is described. This may be made, for example, by the analyzer circuit 114 of FIG. 1. At step 502, a determination has been made that a code adjustment is needed (for example, using the approach of FIG. 4) by an adjustment amount (for example, a speed needs to be increased by a value). If the value is within a first range, at step 504 a first recommendation is made ("Increase speed by X.") If the value is within a second range, at step 506 another recommendation is made ("Increase speed by Y.") For all other values, another recommendation is made ("Increase speed by Z.") at step 508.

At step 510, the recommendation may be sent to a set interface (e.g., a computer screen) to present to a user. The recommendation may be rendered in any appropriate form on a computer screen.

Figure 6A:
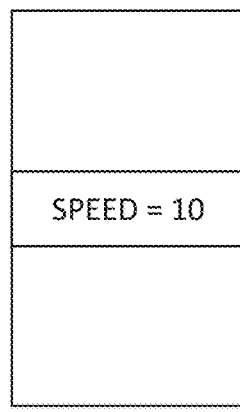
FIG. 6A and FIG. 6B comprise drawings of computer code showing one example of how the code is changed according to various embodiments of the present invention.
Figure 6B:
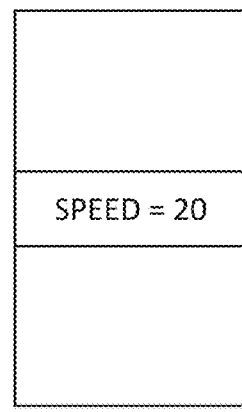

Referring now to FIGS. 6A and 6B, one example of changing the structure of existing computer code at an industrial machine is described. The structure may be changed according to the approaches described herein. FIG. 6A shows computer code 600 with a variable 602. The variable is set to a value of "10." In FIG. 6B, the variable is physically changed to "20" (the structure of the code 600 is therefore changed).

Figure 7A:
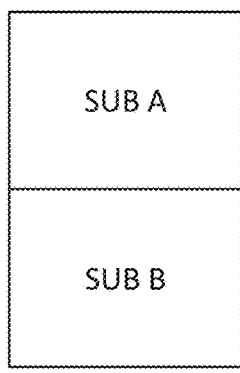
FIG. 7A and FIG. 7B comprise drawings of computer code showing another example of how the code is changed according to various embodiments of the present invention.
Figure 7B:
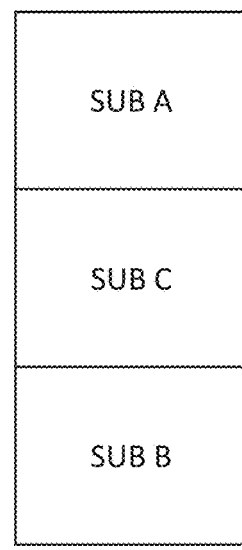

Referring now to FIGS. 7A and 7B, another example of changing the structure of existing computer code at an industrial machine is described. The structure may be changed according to the approaches described herein. In FIG. 7A, the code 700 includes a first subroutine 702 and a second subroutine 704. In FIG. 7B, a third subroutine 706 is added. Consequently, the structure of the code 700 is physically changed.

It will be understood that the examples of FIGS. 6A, 6B, 7A, and 7B are only two examples of how the computer code may be structurally changed by utilizing the approaches described herein. It will also be appreciated that in some instances computer hardware may also be selectively changed (e.g., switching in and out a circuit or filter). Thus, the present approaches are not limited to software-only changes but include all examples of hardware and software.

As mentioned, the approaches described herein may optionally implemented using a computerized industrial internet of things analytics platform that may be deployed at the location of the manufacturing process, at the manufacturing facility premise or in the cloud.

While progress with industrial equipment automation has been made over the last several decades, and assets have become 'smarter,' the intelligence of any individual asset pales in comparison to intelligence that can be gained when multiple smart devices are connected together. Aggregating data collected from or about multiple assets can enable users to improve business processes, for example by improving effectiveness of asset maintenance or improving operational performance if appropriate industrial-specific data collection and modeling technology is developed and applied.

In an example, an industrial asset can be outfitted with one or more sensors configured to monitor respective ones of an asset's operations or conditions. Data from the one or more sensors can be recorded or transmitted to a cloud-based or other remote computing environment. By bringing such data into a cloud-based computing environment, new software applications informed by industrial process, tools and know-how can be constructed, and new physics-based analytics specific to an industrial environment can be created. Insights gained through analysis of such data can lead to enhanced asset designs, or to enhanced software algorithms for operating the same or similar asset at its edge, that is, at the extremes of its expected or available operating conditions.

The systems and methods for managing industrial machines (also referred to assets herein) can include or can be a portion of an Industrial Internet of Things (IMT). In an example, an IIoT connects industrial assets, such as turbines, jet engines, and locomotives, to the Internet or cloud, or to each other in some meaningful way. The systems and methods described herein can include using a "cloud" or remote or distributed computing resource or service. The cloud can be used to receive, relay, transmit, store, analyze, or otherwise process information for or about one or more industrial assets. In an example, a cloud computing system includes at least one processor circuit, at least one database, and a plurality of users or assets that are in data communication with the cloud computing system. The cloud computing system can further include or can be coupled with one or more other processor circuits or modules configured to perform a specific task, such as to perform tasks related to asset maintenance, analytics, data storage, security, or some other function.

However, the integration of industrial assets with the remote computing resources to enable the IIoT often presents technical challenges separate and distinct from the specific industry and from computer networks, generally. A given industrial asset may need to be configured with novel interfaces and communication protocols to send and receive data to and from distributed computing resources. Given industrial assets may have strict requirements for cost, weight, security, performance, signal interference, and the like such that enabling such an interface is rarely as simple as combining the industrial asset with a general purpose computing device.

To address these problems and other problems resulting from the intersection of certain industrial fields and the IIoT, embodiments may enable improved interfaces, techniques, protocols, and algorithms for facilitating communication with and configuration of industrial assets via remote computing platforms and frameworks. Improvements in this regard may relate to both improvements that address particular challenges related to particular industrial assets (e.g., improved aircraft engines, wind turbines, locomotives, medical imaging equipment) that address particular problems related to use of these industrial assets with these remote computing platforms and frameworks, and also improvements that address challenges related to operation of the platform itself to provide improved mechanisms for configuration, analytics, and remote management of industrial assets.

The Predix™ platform available from GE is a novel embodiment of such Asset Management Platform (AMP) technology enabled by state of the art cutting edge tools and cloud computing techniques that enable incorporation of a manufacturer's asset knowledge with a set of development tools and best practices that enables asset users to bridge gaps between software and operations to enhance capabilities, foster innovation, and ultimately provide economic value. Through the use of such a system, a manufacturer of industrial assets can be uniquely situated to leverage its understanding of industrial assets themselves, models of such assets, and industrial operations or applications of such assets, to create new value for industrial customers through asset insights.

Figure 8:
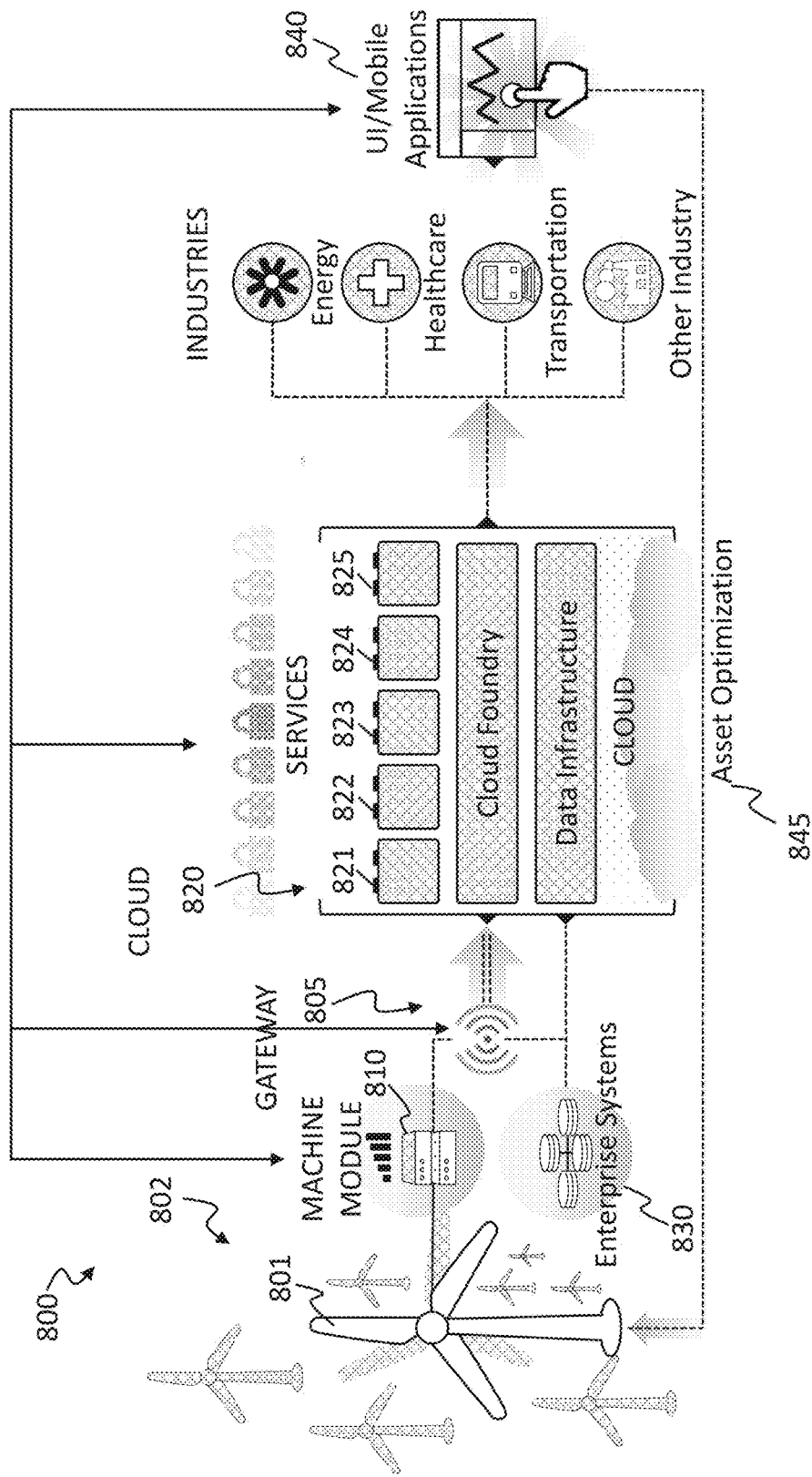
FIG. 8 comprises a drawing of one example of an Asset Management Platform (AMP) according to various embodiments of the present invention.

FIG. 8 illustrates generally an example of portions of a first AMP 800. As further described herein, one or more portions of an AMP can reside in an asset cloud computing system 820, in a local or sandboxed environment, or can be distributed across multiple locations or devices. An AMP can be configured to perform any one or more of data acquisition, data analysis, or data exchange with local or remote assets, or with other task-specific processing devices.

The first AMP 800 includes a first asset community 802 that is communicatively coupled with the asset cloud computing system 820. In an example, a machine module 810 receives information from, or senses information about, at least one asset member of the first asset community 802, and configures the received information for exchange with the asset cloud computing system 820. In an example, the machine module 810 is coupled to the asset cloud computing system 820 or to an enterprise computing system 830 via a communication gateway 805.

In an example, the communication gateway 805 includes or uses a wired or wireless communication channel that extends at least from the machine module 810 to the asset cloud computing system 820. The asset cloud computing system 820 includes several layers. In an example, the asset cloud computing system 820 includes at least a data infrastructure layer, a cloud foundry layer, and modules for providing various functions. In the example of FIG. 8, the asset cloud computing system 820 includes an asset module 821, an analytics module 822, a data acquisition module 823, a data security module 824, and an operations module 825. Each of the modules 821-825 includes or uses a dedicated circuit, or instructions for operating a general purpose processor circuit, to perform the respective functions. In an example, the modules 821-825 are communicatively coupled in the asset cloud computing system 820 such that information from one module can be shared with another. In an example, the modules 821-825 are co-located at a designated datacenter or other facility, or the modules 821-825 can be distributed across multiple different locations.

An interface device 840 can be configured for data communication with one or more of the machine module 810, the gateway 805, or the asset cloud computing system 820. The interface device 840 can be used to monitor or control one or more assets. In an example, information about the first asset community 802 is presented to an operator at the interface device 840. The information about the first asset community 802 can include information from the machine module 810, or the information can include information from the asset cloud computing system 820. In an example, the information from the asset cloud computing system 820 includes information about the first asset community 802 in the context of multiple other similar or dissimilar assets, and the interface device 840 can include options for optimizing one or more members of the first asset community 802 based on analytics performed at the asset cloud computing system 820.

In an example, an operator selects a parameter update for the first wind turbine 801 using the interface device 840, and the parameter update is pushed to the first wind turbine via one or more of the asset cloud computing system 820, the gateway 805, and the machine module 810. In an example, the interface device 840 is in data communication with the enterprise computing system 830 and the interface device 840 provides an operation with enterprise-wide data about the first asset community 802 in the context of other business or process data. For example, choices with respect to asset optimization can be presented to an operator in the context of available or forecasted raw material supplies or fuel costs. In an example, choices with respect to asset optimization can be presented to an operator in the context of a process flow to identify how efficiency gains or losses at one asset can impact other assets. In an example, one or more choices described herein as being presented to a user or operator can alternatively be made automatically by a processor circuit according to earlier-specified or programmed operational parameters. In an example, the processor circuit can be located at one or more of the interface device 840, the asset cloud computing system 820, the enterprise computing system 830, or elsewhere.

Returning again to the example of FIG. 8 some capabilities of the first AMP 800 are illustrated. The example of FIG. 8 includes the first asset community 802 with multiple wind turbine assets, including the first wind turbine 801. Wind turbines are used in some examples herein as non-limiting examples of a type of industrial asset that can be a part of, or in data communication with, the first AMP 800.

In an example, the multiple turbine members of the asset community 802 include assets from different manufacturers or vintages. The multiple turbine members of the asset community 802 can belong to one or more different asset communities, and the asset communities can be located locally or remotely from one another. For example, the members of the asset community 802 can be co-located on a single wind farm, or the members can be geographically distributed across multiple different farms. In an example, the multiple turbine members of the asset community 802 can be in use (or non-use) under similar or dissimilar environmental conditions, or can have one or more other common or distinguishing characteristics.

FIG. 8 further includes the device gateway 805 configured to couple the first asset community 802 to the asset cloud computing system 820. The device gateway 805 can further couple the asset cloud computing system 820 to one or more other assets or asset communities, to the enterprise computing system 830, or to one or more other devices. The first AMP 800 thus represents a scalable industrial solution that extends from a physical or virtual asset (e.g., the first wind turbine 801) to a remote asset cloud computing system 820. The asset cloud computing system 820 optionally includes a local, system, enterprise, or global computing infrastructure that can be optimized for industrial data workloads, secure data communication, and compliance with regulatory requirements.

In an example, information from an asset, about the asset, or sensed by an asset itself is communicated from the asset to the data acquisition module 824 in the asset cloud computing system 820. In an example, an external sensor can be used to sense information about a function of an asset, or to sense information about an environment condition at or near an asset. The external sensor can be configured for data communication with the device gateway 805 and the data acquisition module 824, and the asset cloud computing system 820 can be configured to use the sensor information in its analysis of one or more assets, such as using the analytics module 822.

In an example, the first AMP 800 can use the asset cloud computing system 820 to retrieve an operational model for the first wind turbine 801, such as using the asset module 821. The model can be stored locally in the asset cloud computing system 820, or the model can be stored at the enterprise computing system 830, or the model can be stored elsewhere. The asset cloud computing system 820 can use the analytics module 822 to apply information received about the first wind turbine 801 or its operating conditions (e.g., received via the device gateway 805) to or with the retrieved operational model. Using a result from the analytics module 822, the operational model can optionally be updated, such as for subsequent use in optimizing the first wind turbine 801 or one or more other assets, such as one or more assets in the same or different asset community. For example, information about the first wind turbine 801 can be analyzed at the asset cloud computing system 820 to inform selection of an operating parameter for a remotely located second wind turbine that belongs to a different second asset community.

The first AMP 800 includes a machine module 810. The machine module 810 includes a software layer configured for communication with one or more industrial assets and the asset cloud computing system 820. In an example, the machine module 810 can be configured to run an application locally at an asset, such as at the first wind turbine 801. The machine module 810 can be configured for use with or installed on gateways, industrial controllers, sensors, and other components. In an example, the machine module 810 includes a hardware circuit with a processor that is configured to execute software instructions to receive information about an asset, optionally process or apply the received information, and then selectively transmit the same or different information to the asset cloud computing system 820.

In an example, the asset cloud computing system 820 can include the operations module 825. The operations module 825 can include services that developers can use to build or test Industrial Internet applications, or the operations module 825 can include services to implement Industrial Internet applications, such as in coordination with one or more other AMP modules. In an example, the operations module 825 includes a microservices marketplace where developers can publish their services and/or retrieve services from third parties. The operations module 825 can include a development framework for communicating with various available services or modules. The development framework can offer developers a consistent look and feel and a contextual user experience in web or mobile applications.

In an example, an AMP can further include a connectivity module. The connectivity module can optionally be used where a direct connection to the cloud is unavailable. For example, a connectivity module can be used to enable data communication between one or more assets and the cloud using a virtual network of wired (e.g., fixed-line electrical, optical, or other) or wireless (e.g., cellular, satellite, or other) communication channels. In an example, a connectivity module forms at least a portion of the gateway 805 between the machine module 810 and the asset cloud computing system 820.

In an example, an AMP can be configured to aid in optimizing operations or preparing or executing predictive maintenance for industrial assets. An AMP can leverage multiple platform components to predict problem conditions and conduct preventative maintenance, thereby reducing unplanned downtimes. In an example, the machine module 810 is configured to receive or monitor data collected from one or more asset sensors and, using physics-based analytics (e.g., finite element analysis or some other technique selected in accordance with the asset being analyzed), detect error conditions based on a model of the corresponding asset. In an example, a processor circuit applies analytics or algorithms at the machine module 810 or at the asset cloud computing system 820.

In response to the detected error conditions, the AMP can issue various mitigating commands to the asset, such as via the machine module 810, for manual or automatic implementation at the asset. In an example, the AMP can provide a shut-down command to the asset in response to a detected error condition. Shutting down an asset before an error condition becomes fatal can help to mitigate potential losses or to reduce damage to the asset or its surroundings. In addition to such an edge-level application, the machine module 810 can communicate asset information to the asset cloud computing system 820.

In an example, the asset cloud computing system 820 can store or retrieve operational data for multiple similar assets. Over time, data scientists or machine learning can identify patterns and, based on the patterns, can create improved physics-based analytical models for identifying or mitigating issues at a particular asset or asset type. The improved analytics can be pushed back to all or a subset of the assets, such as via multiple respective machine modules 810, to effectively and efficiently improve performance of designated (e.g., similarly-situated) assets.

In an example, the asset cloud computing system 820 includes a Software-Defined Infrastructure (SDI) that serves as an abstraction layer above any specified hardware, such as to enable a data center to evolve over time with minimal disruption to overlying applications. The SDI enables a shared infrastructure with policy-based provisioning to facilitate dynamic automation, and enables SLA mappings to underlying infrastructure. This configuration can be useful when an application requires an underlying hardware configuration. The provisioning management and pooling of resources can be done at a granular level, thus allowing optimal resource allocation.

In a further example, the asset cloud computing system 820 is based on Cloud Foundry (CF), an open source PaaS that supports multiple developer frameworks and an ecosystem of application services. Cloud Foundry can make it faster and easier for application developers to build, test, deploy, and scale applications. Developers thus gain access to the vibrant CF ecosystem and an ever-growing library of CF services. Additionally, because it is open source, CF can be customized for IIoT workloads.

The asset cloud computing system 820 can include a data services module that can facilitate application development. For example, the data services module can enable developers to bring data into the asset cloud computing system 820 and to make such data available for various applications, such as applications that execute at the cloud, at a machine module, or at an asset or other location. In an example, the data services module can be configured to cleanse, merge, or map data before ultimately storing it in an appropriate data store, for example, at the asset cloud computing system 820. A special emphasis has been placed on time series data, as it is the data format that most sensors use.

Security can be a concern for data services that deal in data exchange between the asset cloud computing system 820 and one or more assets or other components. Some options for securing data transmissions include using Virtual Private Networks (VPN) or an SSL/TLS model. In an example, the first AMP 800 can support two-way TLS, such as between a machine module and the security module 824. In an example, two-way TLS may not be supported, and the security module 824 can treat client devices as OAuth users. For example, the security module 824 can allow enrollment of an asset (or other device) as an OAuth client and transparently use OAuth access tokens to send data to protected endpoints.

In the example of FIG. 8, it will be understood that the approaches described herein with respect to FIGS. 1-7 may be implemented using the AMP 800 that may be deployed at the first asset community 802, at the wind turbine 801, or in the cloud 820. In one example, the analyzer circuit 114 of FIG. 1 may be deployed at any of these locations and adjust software at the wind turbine 801.

It will be appreciated by those skilled in the art that modifications to the foregoing embodiments may be made in various aspects. Other variations clearly would also work, and are within the scope and spirit of the invention. It is deemed that the spirit and scope of that invention encompasses such modifications and alterations to the embodiments herein as would be apparent to one of ordinary skill in the art and familiar with the teachings of the present application.

What is claimed is:

1. A method of optimizing a manufacturing process, the method comprising:
analyzing a first part or a first component to determine results of a manufacturing action at a manufacturing facility on the first part or the first component, wherein a measured physical variance is determined to exist between the results of the manufacturing action and a desired result of the manufacturing action, the measured physical variance being obtained by a sensor deployed at the manufacturing facility, wherein the manufacturing action is directed by executable computer code, the desired result being conformance to a product specification defining acceptable physical characteristics of the product;
identifying specific portions of the computer code related to selected types of physical variances;

creating a mapping structure that maps ranges of the particular physical variances to changes in the specific portions of the computer code, the changes in the specific portions of the computer code affecting the size of the code;

applying the measured physical variance to the mapping structure to obtain a change related to the specific portions of the code, and subsequently selectively changing a structure of the computer code at the manufacturing facility in order to optimize the results of a manufacturing action at the manufacturing facility, the computer code being stored in a memory and executed by a processor, wherein the processor determines that speed is controlled by a particular part of the code;

wherein the change to the computer code at the manufacturing facility is accomplished without human intervention and occurs solely at the manufacturing facility;

subsequently performing the manufacturing action on a second part or second component, the manufacturing action being directed by the computer code having the changed structure;

wherein the computer code having the changed structure controls the timing of the manufacturing action or the dimensions of the second part or component produced by the manufacturing action;

wherein the manufacturing action is effective to change the physical structure of the second part or component;

performing the manufacturing action on a third part or third component and measuring the results of the manufacturing action on the third part or component, and when the results fall within the product specification, re-setting the code to its original structure.

2. The method of claim 1, further comprising when the results are acceptable, re-setting the structure of the code to its original structure.

3. The method of claim 1, wherein the changing of the structure of the computer code is accomplished by adding or deleting a subroutine call to the computer code.

4. The method of claim 1, wherein the changing of the structure of the computer code is accomplished by adding additional computer code to the computer code.

5. The method of claim 1, wherein the changing of the structure of the computer code is accomplished by deleting existing computer code from the computer code.

6. The method of claim 1, wherein the manufacturing action comprises an action selected from the group consisting of: grinding, milling, measuring, and cutting.

7. The method of claim 1, further comprising determining recommendations for selective changes to the computer code and displaying the recommendations to a user.

8. The method of claim 7, further comprising accepting user input as to whether to accept the recommendation.

9. The method of claim 1, further comprising analyzing the results of the optimized manufacturing action on the first part or component.

10. A system, comprising:
an industrial machine deployed at a manufacturing facility, the industrial machine being configured to perform a manufacturing action on a first part or first component, the machine including a controller executing computer code that directs the manufacturing action;

wherein specific portions of the computer code relate to selected types of physical variances;

a memory at the manufacturing facility storing a mapping structure that maps ranges of the particular physical variances to changes in the specific portions of the computer code, the changes in the specific portions of the computer code affecting the size of the code;

an analyzer circuit deployed at the manufacturing facility, the analyzer circuit being configured to examine the first part or first component to determine results of the manufacturing action, wherein a measured physical variance is determined to exist between the results of the manufacturing action and a desired result of the manufacturing action, the desired result being conformance to a product specification defining acceptable physical characteristics of the product, the analyzer circuit further configured to based upon the results, apply the measured physical variance to the mapping structure to obtain a change related to the specific portions of the computer code, and subsequently selectively change a structure of the computer code at the manufacturing facility to optimize the results of a manufacturing action at the manufacturing facility;

wherein the machine is configured to subsequently perform the manufacturing action on a second part or second component, the manufacturing action being directed by the computer code that has the changed structure;

wherein the changes to the computer code are accomplished without human intervention and occur solely at the manufacturing facility;

wherein the manufacturing action is subsequently performed on a second part or second component, the manufacturing action being directed by the computer code having the changed structure;

wherein the computer code having the changed structure controls the timing of the manufacturing action or the dimensions of the second part or component produced by the manufacturing action;

wherein the manufacturing action is effective to change the physical structure of the second part or component;

wherein the manufacturing action is performed on a third part or third component and the results of the manufacturing action on the third part or component are measured, and when the results fall within the product specification, the code is reset to its original structure.

11. The system of claim 10, wherein the structure of the computer code is changed by adding or deleting a subroutine call to the computer code.

12. The system of claim 10, wherein the structure of the computer code is changed by adding additional computer code to the computer code.

13. The system of claim 10, wherein the structure of the computer code is changed by deleting existing computer code from the computer code.

14. The system of claim 10, wherein the manufacturing action comprises an action selected from the group consisting of: grinding, milling, measuring, and cutting.

15. The system of claim 10, wherein the machine determines potential adjustment recommendations to the computer code and displays the recommendations to a user.

16. The system of claim 10, further comprising a user interface coupled to the machine, the user interface being configured to accept user input as to whether to accept the recommendation.

17. The system of claim 10, wherein the analyzer circuit is configured to record the results for future usage.

* * * * *